No. 729,354. PATENTED MAY 26, 1903.
A. B. KEPNER.
SEED PLANTER.
APPLICATION FILED DEC. 17, 1902.
NO MODEL. 2 SHEETS—SHEET 1.

No. 729,354. PATENTED MAY 26, 1903.
A. B. KEPNER.
SEED PLANTER.
APPLICATION FILED DEC. 17, 1902.
NO MODEL. 2 SHEETS—SHEET 2
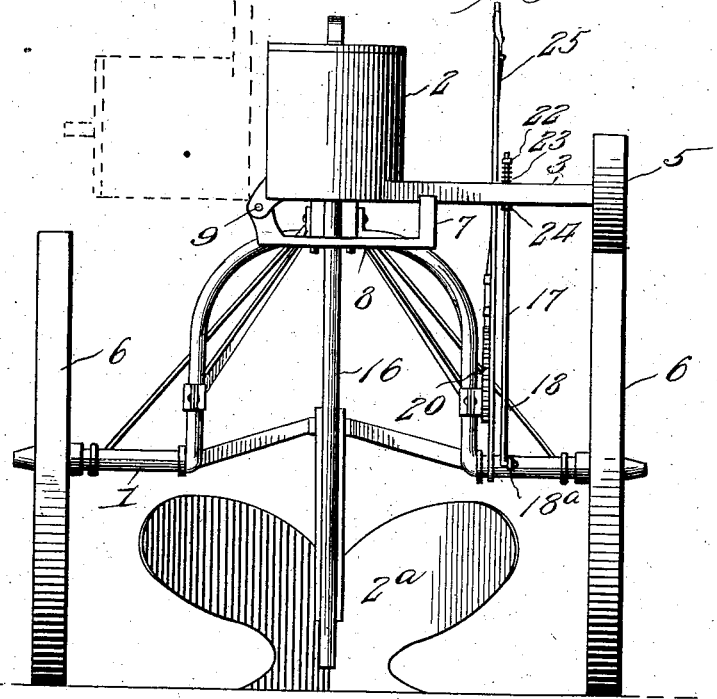
Witnesses
Inventor
Albertus B. Kepner,
By Victor J. Evans Attorney No. 729,354.

Patented May 26, 1903.

UNITED STATES PATENT OFFICE.

ALBERTUS B. KEPNER, OF BETHANY, NEBRASKA.

SEED-PLANTER.

SPECIFICATION forming part of Letters Patent No. 729,354, dated May 26, 1903.

Application filed December 17, 1902. Serial No. 135,553. (No model.)

*To all whom it may concern:*

Be it known that I, ALBERTUS B. KEPNER, a citizen of the United States, residing at Bethany, in the county of Lancaster and State of Nebraska, have invented new and useful Improvements in Seed-Planters, of which the following is a specification.

My invention relates to new and useful improvements in seed-planters; and it relates more particularly to the seed-dropping mechanism; and its object is to provide a device of novel construction adapted to be operated from the traction-wheel of the planter through a friction-pulley.

Another object is to pivotally mount the seed-hopper and the dropping mechanism upon the frame of the planter, whereby the same may be swung upward out of operative position.

A further object is to employ means for holding the friction-pulley in operative relation with the traction-wheel when it is desired to drop the seed from the hopper.

With the above and other objects in view the invention consists in the novel construction and combination of parts hereinafter more fully described and claimed, and illustrated in the accompanying drawings, showing the preferred form of my invention, and in which—

Figure 1:
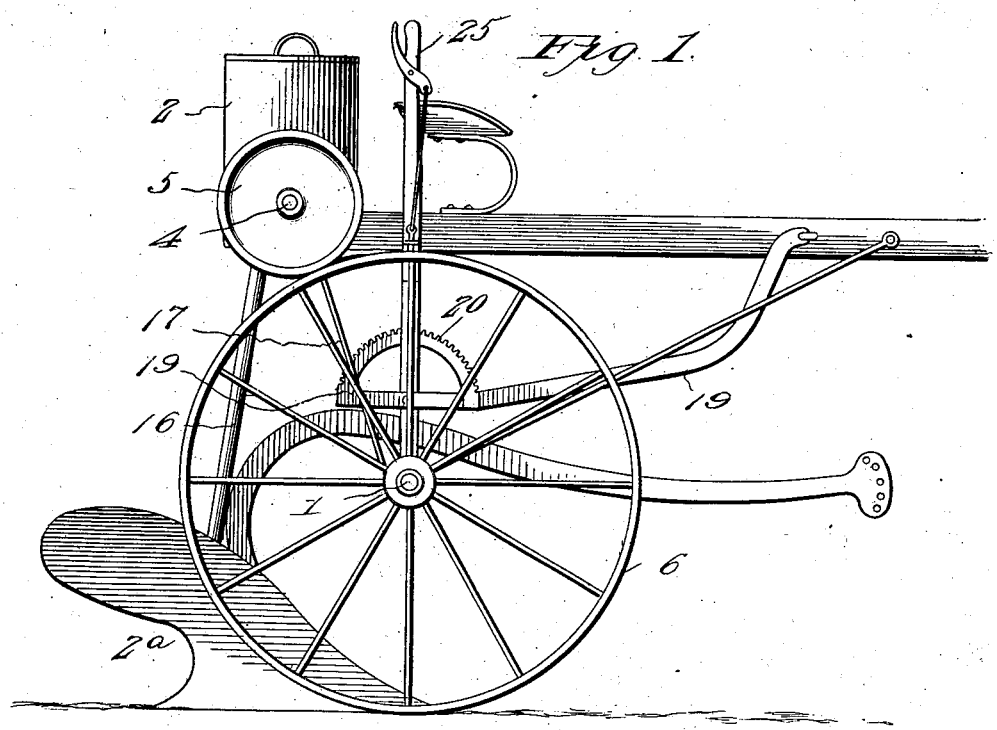
Figure 2:
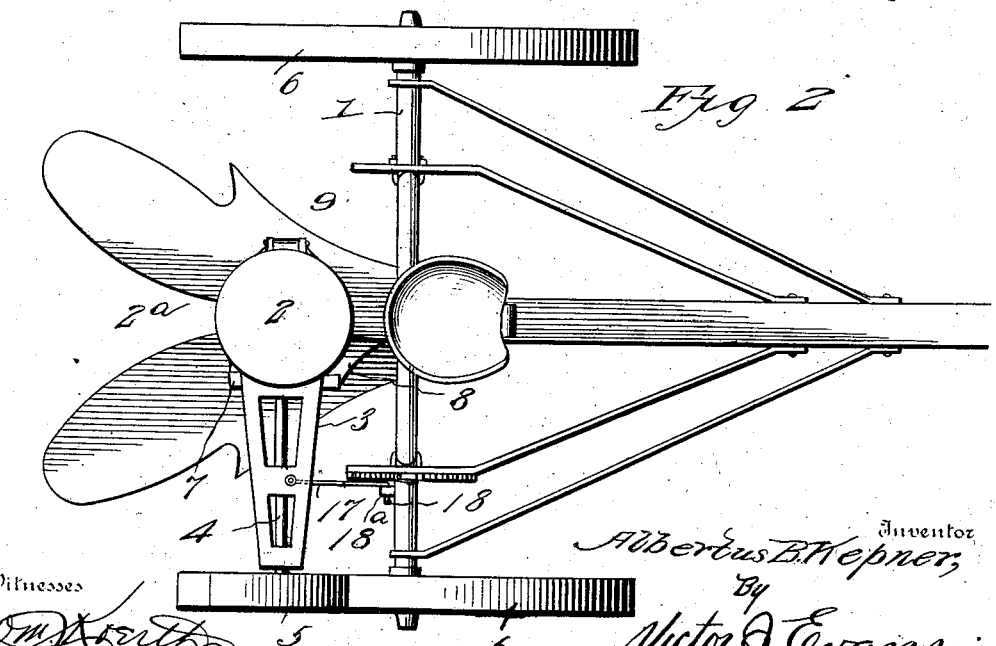

Figure 1 is a side elevation of a planter, showing my improved seed-dropping mechanism in operative position thereon. Fig. 2 is a plan view thereof. Fig. 3 is a rear elevation showing in dotted lines the position to which the hopper may be moved if desired. Fig. 4 is an enlarged vertical section through the hopper and its seed-dropping mechanism; and Fig. 5 is a section on the line $x\ x$, Fig. 4.

Referring to the figures by numerals of reference, 1 designates the crank-axle of a planter, from which is suspended a plow $2^a$. This planter is of any desired construction, and to the frame thereof is hinged the bottom of a hopper 2. An arm 3 extends laterally from this hopper, and a shaft 4 is journaled therein and is provided at its outer end with a pulley 5, adapted to normally bear upon one of the traction-wheels 6 of the planter. The arm 3 normally rests between ears 7, extending upward from a casting 8, secured to the frame of the planter, and these ears serve to prevent undue lateral strain upon the hinge 9 of the hopper.

A ring 10, having beveled teeth thereon, fits snugly and is revoluble within the hopper 2 at the bottom thereof, and this ring is keyed to a disk 11, having a series of apertures 12 arranged adjacent to the periphery thereof and at desired distances apart. The teeth upon the ring 10 are adapted to mesh with a beveled gear 13, secured to the end of shaft 4 which extends under the hopper. It will thus be seen that when the shaft is revolved the disk 11 is caused to rotate upon its central pivot 14, and the apertures 12 are caused to successively register with an outlet 15 (shown in dotted lines in Fig. 5) and formed within the bottom of the hopper at the side thereof. This outlet normally lies at a point directly above the end of a seed drill or tube 16, and it is obvious that all seed dropping therethrough will pass into the drill and be deposited at the proper point.

A rod 17 is slidably mounted within cross-bar 3' of arm 3, and is provided at its lower end with a hook 18, adapted to engage a lug $18^a$, extending backward from the axle 1. The upper portion of rod 17 is screw-threaded, as shown at 21, and a nut 22 is arranged thereon and bears upon the coiled spring 23, interposed between said nut and the top of cross-bar 3'. This spring serves to force the arm 3 downward when the hook 18 is in engagement with the axle of the planter, and the friction-pulley 5 is thus pressed firmly against the periphery of the traction-wheel 6 and is adapted to be revolved thereby. A nut 24 is also arranged on rod 17 at a point below the cross-bar 3' and is adapted to bear upon the lower surface of said cross-bar.

It is believed that the operation of the seed-dropping mechanism will be fully understood from the foregoing description. As the wheel 6 revolves rotary motion is imparted to the pulley 5, and as the shaft 4 and its beveled gear 13 are turned the toothed ring 10 revolves within the hopper and carries disk 11 therewith. The seed within the hopper is collected in the apertures 12, and as these are brought successively into position above the outlet 15 they will drop therethrough into the tube 16. When the plow is raised by turning axle 1 by means of a lever 25, the lug 18ª upon said axle will force rod 17 upward, and the nut 24 will be brought into contact with the cross-bar 3' of arm 3 and raise the pulley 5 out of contact with the traction-wheel. When it is desired to raise the hopper and its arm 3 for the purpose of oiling, repairing, or cleaning the parts, it is merely necessary to remove the hooked end 18 of rod 17 from the lug 18ª and swing the hopper upward upon its hinge.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus fully described my invention, what I claim as new is—

1. In a planter the combination with a crank-axle having a plow connected thereto and traction-wheels thereon, and means for revolving said axle independently of the wheels; of a frame mounted upon the axle, a hopper thereon having an outlet dropping mechanism, a rotary shaft for operating said mechanism, a pulley upon the shaft normally engaging with the traction-wheel on the axle, and raising and lowering means connected to the shaft and axle.

2. In a planter the combination with a crank-axle having traction-wheels thereon, a plow suspended from said axle, and means for turning the axle independently of the wheels; of a frame mounted upon the axle, a hopper hinged upon the frame, an arm to the hopper, a dropping mechanism within the hopper, a shaft journaled upon the arm and adapted when rotated to operate said mechanism, a pulley upon the shaft normally engaging with one of the traction-wheels, and raising and lowering means connecting the arm and axle.

3. In a planter the combination with a crank-axle having traction-wheels thereon, a plow suspended from said axle, and means for turning the axle independently of the wheels; of a frame upon the axle, a hopper hinged to the frame, an arm extending laterally from the hopper, dropping mechanism in the hopper, a shaft journaled upon the arm and adapted when rotated to operate said dropping mechanism, a pulley upon the shaft normally engaging with one of the traction-wheels, a lug upon the axle, a rod connecting the arm and lug.

4. In a planter the combination with a crank-axle having traction-wheels mounted thereon, a plow suspended from said axle, means for turning the axle independently of the wheels, and a lug upon the axle; of a frame mounted upon said axle, a hopper hinged thereto, dropping mechanism within the hopper, an arm extending laterally from the hopper, a shaft journaled thereon and adapted when rotated to operate the dropping mechanism, a pulley upon the shaft normally engaging with one of the traction-wheels, and a hooked rod in the arm detachably secured to the lug on the axle, means for limiting the movement of the rod within the arm, and a spring upon the rod.

5. In a planter, the combination with a crank and axle having traction-wheels thereon, a plow suspended from said axle and means for turning the axle independently of the wheels, of a frame mounted upon the axle, a hopper thereon having an outlet, dropping mechanism within the hopper, and a spring-pressed pulley connected to said mechanism and normally bearing upon a traction-wheel.

6. The combination with a planter having traction-wheels, a hopper and an outlet from said hopper, of a rotary disk within the hopper having an aperture adapted to register with the outlet, a toothed ring connected to the disk, a spring-pressed rotary shaft, a gear at one end thereof meshing with the ring, and a friction-pulley at the other end of the shaft normally bearing upon a wheel of the planter.

In testimony whereof I affix my signature in presence of two witnesses.

ALBERTUS B. KEPNER.

Witnesses:
GUS A. HYERS,
H. K. FRANTZ.